United States Patent Office 3,405,134
Patented Oct. 8, 1968

3,405,134
QUINUCLIDYL ESTERS OF AROMATIC ACIDS
Claude I. Judd, Mequon, Wis., assignor to Colgate-Palmolive Company, New York, N.Y., a corporation of Delaware
No Drawing. Filed Aug. 17, 1965, Ser. No. 480,490
3 Claims. (Cl. 260—294.3)

ABSTRACT OF THE DISCLOSURE

The compounds are substituted benzoic acid esters of 3-quinuclidinol which are useful as central nervous system stimulants and as intermediates in the preparation of more complex chemical and pharmaceutical agents. A species disclosed is 3-quinuclidyl m-benzyloxybenzoate.

---

This application relates to novel esters of 3-quinuclidinol. More particularly, it relates to substituted benzoic acid esters of 3-quinuclidinol and the non-toxic pharmaceutically acceptable salts thereof.

The compounds of the present invention may be represented by the following formula:

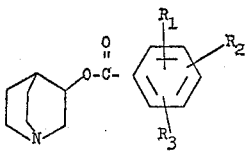

in which $R_1$, $R_2$ and $R_3$ are members of the group consisting of hydrogen, lower alkoxy such as methoxy, ethoxy, propoxy and butoxy, and aralkoxy such as benzyloxy.

The novel esters of the present invention may be prepared by treating 3-quinuclidinol with an esterifying derivative of the desired acid, such as the acid chloride or the acid bromide.

This process may be represented as follows:

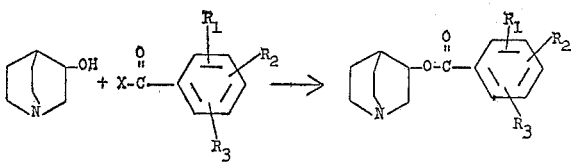

wherein X is a reactive halogen such as chlorine or bromine and $R_1$, $R_2$ and $R_3$ are as previously described.

The esters of the present invention are preferably prepared by dissolving the acid chloride in an inert solvent, such as chloroform or toluene, and adding the resulting solution to a second solution which consists of the 3-quinuclidinol dissolved in the same solvent. When the addition is complete, the resulting mixture is stirred at reflux for about 2 to about 6 hours. The solids which form are separated by filtration from the hot solution and the filtrates are evaporated under reduced pressure. The oily residues which form are treated with anhydrous ether to yield the desired ester, usually as a crystalline product. If desired, the ester can be purified by recrystallization and other conventional procedures.

The 3-quinuclidinol which is employed as a starting material is preferably prepared by the reduction of the corresponding ketone, 3-quinuclidone. The alcohol may be prepared from the ketone by the catalytic hydrogenation of the hydrochloride or acetate in the presence of a suitable catalyst such as platinum oxide. Alternatively, the alcohol may be prepared by hydrogenation employing Raney nickel as a catalyst. The alcohol may also be prepared by treating the ketone with a chemical reducing agent such as lithium aluminum hydride in ether. J. of the Am. Chem. Soc., 74, 2215–2221 (1952), and U.S. Patent No. 2,648,667. The 3-quinuclidone employed in the preparation of the alcohol may be prepared as described by Clemo and Metcalfe in J. Chem. Soc., 1989 (1937).

Illustrative of the esterifying derivatives intended for use in the present invention are the following:

m-benzyloxybenzoyl chloride,
4-benzyloxybenzoyl chloride, and
3,4,5-trimethoxybenzoyl chloride.

These acid chlorides are known compounds and may be prepared from the corresponding acids by conventional procedures.

Representative of the novel esters which can be produced in the above manner are the following:

3-quinuclidyl m-benzyloxybenzoate,
3-quinuclidyl p-benzyloxybenzoate, and
3-quinuclidyl 3,4,5-trimethoxybenzoate.

The esters of the present invention, as well as their pharmaceutically acceptable salts, are central nervous system stimulants of the antidepressant and antifatigue type. These compounds may also be used as intermediates in the preparation of more complex chemical and pharmaceutical agents.

The compounds can be administered to animals as pure compounds, as the bases, or in the form of pharmaceutically acceptable salts. However, to obtain a more practical size to dosage relationship, one or more of the compounds is generally combined with a suitable pharmaceutical carrier and made into unit dosage forms. These dosage forms may be made for either oral or parenteral administration.

Pharmaceutical carriers which are either liquid or solid may be employed. The preferred liquid carrier is water. However, in the event the compound is not soluble or miscible in water, an organic solvent such as propylene glycol may be employed. Flavoring materials may be included if desired.

Solid pharmaceutical carriers such as starch, sugar and talc can be utilized to form powders. These powders can be used as such or can be tableted or used to fill gelatin capsules. Suitable lubricants such as magnesium stearate, binders such as gelatin, and disintegrating agents such as sodium carbonate in combination with citric acid may be employed in the formation of the tablets.

Unit dosage forms, such as tablets and capsules, may contain any suitable predetermined amount of one or more of the active ingredients as a non-toxic acid addition salt and may be administered one or more at a time at regular intervals. Such unit dosage forms, however, should advisedly contain between 5 to 150 mg. of the active agent.

A typical tablet may have the following composition:

|   | Mg. |
|---|---|
| (1) 3-quinuclidyl m-benzyloxybenzoate | 10 |
| (2) Starch U.S.P. | 57 |
| (3) Lactose U.S.P. | 73 |
| (4) Talc U.S.P. | 9 |
| (5) Stearic acid | 6 |

Powders (1), (2) and (3) are slugged, then granulated, mixed with (4) and (5) and tableted.

Capsules may be prepared by filling No. 3 hard gelatin capsules with the following ingredients:

| | Mg. |
|---|---|
| (1) 3-quinuclidyl m-benzyloxybenzoate hydrochloride | 20 |
| (2) Lactose U.S.P. | 200 |
| (3) Starch U.S.P. | 16 |
| (4) Talc U.S.P. | 8 |

The oral route is generally preferred for administering the compounds of this invention. However, other routes of administration such as parenteral may be employed.

The following examples are presented to illustrate this invention.

EXAMPLE 1

3-quinuclidyl m-benzyloxybenzoate hydrochloride

A solution of 48.5 g. (0.197 mole) m-benzyloxybenzoyl chloride in 200 ml. chloroform is added dropwise with stirring to a solution of 25.0 g. (0.197 mole) 3-quinuclidinol in 100 ml. chloroform and the resulting mixture is stirred at reflux for 4.5 hours. The solids are separated by filtration from the hot solution and the filtrates are evaporated under reduced pressure. The oily residues, 64.1 g. (84.5%), crystallize when treated with anhydrous ether to yield the crude product, M.P. 169–172° C. Ten grams of this solid is dissolved in isopropanol, treated with activated carbon, filtered and cooled. The solids which separate are collected by filtration, and recrystallized a second time from isopropanol to yield 3-quinuclidyl m-benzyloxybenzoate hydrochloride, M.P. 186–188° C.

*Analysis.*—Calcd. for $C_{21}H_{24}ClNO_3$: C, 67.46; H, 6.47; N, 3.75; Cl, 9.48. Found: C, 67.3; H, 6.7; N, 3.71; Cl 9.51.

EXAMPLE 2

3-quinuclidyl p-benzyloxybenzoate hydrochloride

A mixture of 6.85 g. (0.05 mole) 3-quinuclidinol and 2.40 g. (0.05 mole) 50% sodium hydride and 100 ml. dry toluene is stirred at reflux for one hour, cooled slightly and a solution consisting of 12.30 g. (0.05 mole) 4-benzyloxybenzoyl chloride in 100 ml. dry toluene is added and the mixture stirred at reflux for two hours and cooled the inorganic solids are removed by filtration. The filtrates are evaporated under reduced pressure and the residues solidified. The residues are then dissolved in ether, filtered through a diatomaceous earth bed and acidified with anhydrous hydrogen chloride. The solids which form are collected by filtration and recrystallized from isopropanol to yield 3-quinuclidyl p-benzyloxybenzoate hydrochloride, M.P. 236° C.

*Analysis.*—Calcd. for $C_{21}H_{24}ClNO_3$: C, 67.46; H, 6.47; N, 3.75; Cl. 9.48. Found: C, 67.05; H, 7.0; N, 3.78; Cl, 9.54.

EXAMPLE 3

3-quinuclidyl 3,4,5-trimethoxybenzoate hydrochloride

The procedure of Example 1 is repeated employing 3,4,5-trimethoxybenzoyl chloride as the esterifying agent in place of m-benzyloxybenzoyl chloride, 3-quinuclidyl 3,4,5-trimethoxybenzoate hydrochloride is obtained, M.P. 214–216° C.

*Analysis.*—Calcd. for $C_{17}H_{24}ClNO_5$: C, 57.06; H, 6.76; N, 3.91; Cl, 9.91. Found: C, 57.0; H, 7.0; N, 3.90; Cl 9.93.

I claim:
1. A compound of the formula

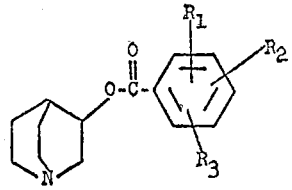

wherein $R_1$, $R_2$ and $R_3$ are selected from the group consisting of hydrogen and benzyloxy and at least one of $R_1$, $R_2$ and $R_3$ are benzyloxy.

2. 3-quinuclidyl m-benzyloxybenzoate.
3. 3-quinuclidyl p-benzyloxybenzoate.

References Cited

UNITED STATES PATENTS 2,648,667   8/1953   Sternbach.
2,917,515   12/1959   Grob.

OTHER REFERENCES

Mashkovsky: Proc. of the First Int. Pharm. Meeting, vol. 7, pp. 359–366 (1963), London, Pergamon (publishers).

JAMES A. PATTEN, *Primary Examiner.*

E. D. LEWIS, *Assistant Examiner.*